(12) United States Patent
Beebe

(10) Patent No.: US 6,834,559 B1
(45) Date of Patent: Dec. 28, 2004

(54) VIBRATION COMPENSATION SYSTEM FOR TIRE TESTING SYSTEMS

(75) Inventor: James C. Beebe, Brimfield, OH (US)

(73) Assignee: Illinois Tool Works Inc., Glenview, IL (US)

( * ) Notice: Subject to any disclaimer, the term of this patent is extended or adjusted under 35 U.S.C. 154(b) by 362 days.

(21) Appl. No.: 10/030,610

(22) PCT Filed: Jul. 6, 2000

(86) PCT No.: PCT/US00/18568

§ 371 (c)(1),
(2), (4) Date: Jan. 8, 2002

(87) PCT Pub. No.: WO01/02826

PCT Pub. Date: Jan. 11, 2001

Related U.S. Application Data
(60) Provisional application No. 60/143,007, filed on Jul. 9, 1999.

(51) Int. Cl.$^7$ ............................................. G01M 19/00
(52) U.S. Cl. ........................................................ 73/865.8
(58) Field of Search .......................... 702/41; 303/6.01, 303/7; 73/660, 865.9, 146, 865.8; 152/152.1

(56) References Cited

U.S. PATENT DOCUMENTS

| | | | |
|---|---|---|---|
| 3,817,003 A | 6/1974 | Monajjem | |
| 3,849,942 A | 11/1974 | Monajjem | |
| 3,914,907 A | 10/1975 | Hofelt, Jr. et al. | |
| 3,987,672 A | 10/1976 | Loyer | |
| 4,024,372 A | 5/1977 | Herrmann | |
| 4,191,055 A | 3/1980 | Orem et al. | |
| 4,241,300 A | 12/1980 | Hayes et al. | |
| 4,489,598 A | 12/1984 | Beebe et al. | |
| 4,489,607 A | 12/1984 | Park | |
| 4,576,040 A | 3/1986 | Cargould | |
| 4,704,900 A | 11/1987 | Beebe | |
| 4,805,125 A | 2/1989 | Beebe | |
| 4,815,004 A | 3/1989 | Beebe | |
| 4,852,398 A | 8/1989 | Cargould et al. | |
| 5,027,649 A | 7/1991 | Himmler | |
| 5,052,218 A | 10/1991 | Iwama | |
| 5,067,348 A | 11/1991 | Himmler et al. | |
| 5,103,595 A | 4/1992 | Dale et al. | |
| 5,448,910 A * | 9/1995 | Yurjevich et al. | 73/146 |
| 5,614,676 A * | 3/1997 | Dutt et al. | 73/660 |
| 5,979,231 A | 11/1999 | Lees, Sr. et al. | |
| 5,992,227 A | 11/1999 | Jellison et al. | |
| 6,016,695 A | 1/2000 | Reynolds et al. | |
| 6,035,709 A | 3/2000 | Barnette, Jr. | |
| 6,082,191 A | 7/2000 | Neiferd et al. | |

FOREIGN PATENT DOCUMENTS

| | | |
|---|---|---|
| GB | 2104010 | 3/1983 |
| WO | WO98/04897 | 2/1998 |

* cited by examiner

Primary Examiner—William Oen
(74) Attorney, Agent, or Firm—Watts Hoffmann Co., LPA

(57) ABSTRACT

An apparatus and method for improving the measurement of force variation in a tire (20) being tested on a tire uniformity machine. The apparatus includes a loadwheel assembly (500) including a rotatable loadwheel (510) connected to load sensors (530, 540) for detecting forces imposed on the loadwheel (510) by a tire (20) being tested. Vibration sensors (700, 702, 704) are associated with the loadwheel assembly (500) for detecting vibrations in the loadwheel (510) caused by forces other than the forces applied by the tire (20). Means is provided for subtracting the vibration induced forces from the tire (20) imposed forces in order to provide more precise tire uniformity data. The vibration sensors (700, 702, 704) which comprise accelerometers are used to determine vibration induced forces in the lateral and radial direction with respect to the loadwheel (510). The signals provided by the accelerometers (700, 702, 704) are communicated to a differential amplifier which also receives signals from the load cells (530, 540). The net signal more closely represents the actual force variation generated by the tire (20) being tested.

12 Claims, 5 Drawing Sheets

VIBRATION COMPENSATION SYSTEM FOR TIRE TESTING SYSTEMS

This application claims the benefit of Provisional application Ser. No. 60/143,007, filed Jul. 9, 1999.

TECHNICAL FIELD

The present invention relates generally to tire testing of the type that measures tire uniformity and, in particular, to an improved method and apparatus for acquiring more accurate tire uniformity data so that some or all of the irregularities detected in the tire during the testing process can be corrected more precisely.

BACKGROUND ART

In the manufacture of tires, various irregularities and variations in the dimensions in the tires can arise. For example, dimensional irregularities can arise from inaccuracies in the molding process, changes in the characteristics of the materials and compounds employed in manufacturing the tires, inaccurate centering and variations in the vulcanization process, etc. All of the possible irregularities and variations in the tires, which can arise during manufacture, either singularly or through interaction with one another, can cause eccentricity, static and dynamic unbalance in the tire, and force variation which can result in tire vibration or noise during use.

It is possible to correct many of these irregularities by first measuring the tire variations and applying various corrective actions to the tire. To measure the variations, the tire is placed in a tire uniformity inspection machine. In currently available tire uniformity inspection machines, testing is fully automatic. Tires are fed by conveyor to a test station where each tire is mounted upon a chuck, inflated to a predetermined pressure and rotatably driven at a standard speed with its tread surface in abutting contact with the circumferential surface of a loadwheel. The loadwheel is instrumented with load cells that measure forces due to the tire acting on the loadwheel. The data gathered during the testing process may be used to grade the tire and/or to take immediate corrective action via shoulder and tread grinders, which selectively grind rubber from regions of the tire to compensate for the variations detected during the testing process. Alternately, or additionally, the data taken during the testing cycle may be used to mark specific regions of the tire to alert the installer to an area of interest, such as an irregularity or point of high force in the tire, which will enable the installer to take corrective or compensating action during the installation of the tire onto a wheel.

In a typical tire testing system the loadwheel is free to rotate about an axis parallel to the rotational axis of the tire. The loadwheel has spindles at its opposite ends provided with load cells which measure forces acting on the loadwheel in directions of interest. Precise measurement of the forces exerted by the tire permits accurate adjustment of the uniformity of the tire after the force measuring procedure, for example, by grinding devices which remove excess tire material to correct any irregularities that may have arisen during the manufacturing process.

An example of a tire testing system and a load wheel construction is described in copending U.S. applications Ser. Nos. 08/988,480 and 08/988,509, respectively. In these systems, the loadwheel spindles are provided with load cells that are secured to a movable carriage. The carriage is attached to a ball screw housed driven by a motor and gear reduction unit. Rotation of the screw shaft moves the ball screw and carriage toward or away from the tire being tested, the carriage sliding along the frame of the machine. A servomechanism moves the carriage to a desired position based on the force signals generated by the load cells.

Although prior art tire testing systems, and in particular known loadwheel assemblies used therewith, measure tire uniformity in an acceptable manner, several drawbacks exist so as to leave room for improvement. The loadwheel assembly (which includes a loadwheel, axle and bearings) is fairly heavy. As a result, the load cells receive and respond to the motion of the overall machine frame, as well as the forces produced by the rotating tire. The motions in the machine frame can be caused by external vibration, such as that produced by the traffic of industrial trucks near the machine or by vibrations internal to the machine, such as that produced by the operation of tire conveyors or grinders that form part of the testing machine.

The forces caused by these extraneous vibrations are undesirable, and represent errors in the measurement system. In prior art devices, attempts have been made to avoid these errors by having the tire testing machines installed on massive foundations or, alternately, sequencing the machines in a way that avoids actuating or moving the subassemblies of the machine (such as grinders) while measurements are being taken. These prior art methods have substantially added to the cost of the installation and have also increased the operating costs due to increased cycle time and reduced throughput of the machine.

DISCLOSURE OF THE INVENTION

The present invention provides an improved method and apparatus for obtaining tire uniformity data of a tire being tested in a tire uniformity machine. In the preferred and illustrated embodiment, the apparatus includes a loadwheel assembly including a rotatable loadwheel. Load sensors or load cells for detecting forces imposed on the loadwheel by a tire being tested also form part of the assembly. A vibration sensor for detecting vibrations in the loadwheel is also provided. The vibrations being monitored are generally caused by movements in the frame of the machine caused by industrial lift truck traffic in the vicinity of the machine or movement of components, such as conveyors and grinders within the machine itself. The signal or information obtained from the vibration sensor is subtracted from the overall signal or data generated by the load cells in order to provide more precise tire uniformity data.

The disclosed apparatus reduces or eliminates the error that sometimes occurs in tire uniformity data measurements due to extraneous forces or vibrations that are received by the load cells during the testing of a tire.

In the preferred embodiment, the vibration sensor comprises an accelerometer mounted to the loadwheel assembly. In the illustrated embodiment, at least two accelerometers are used, one for detecting the lateral force component and one for detecting the radial force component. In a more preferred construction of the illustrated embodiment, two radial accelerometers are used, because due to existing componentry, a single radial accelerometer cannot be mounted in alignment with a radial plane of the loadwheel assembly. As a result, two symmetrically-spaced radial accelerometers are used.

In the illustrated embodiment, the signal generated by an accelerometer is communicated to a differential amplifier via a conditioning circuit and a scaler. The scaling factor used by the scaler is determined by the characteristics of the accelerometer being used. A signal from the load cells which represents the total force on the loadwheel is also communicated to the differential amplifier. The total force includes both forces generated by the tire being tested, as well as the forces generated by vibrations applied to the tire machine. The resuting net signal from the differential amplifier is one that more precisely reflects the actual tire uniformity data of the tire being measured.

Additional features of the invention will become apparent and fuller understanding obtained by reading the following detailed description in connection with the accompanying drawings.

BEST MODE FOR CARRYING OUT THE INVENTION

Figure 1:
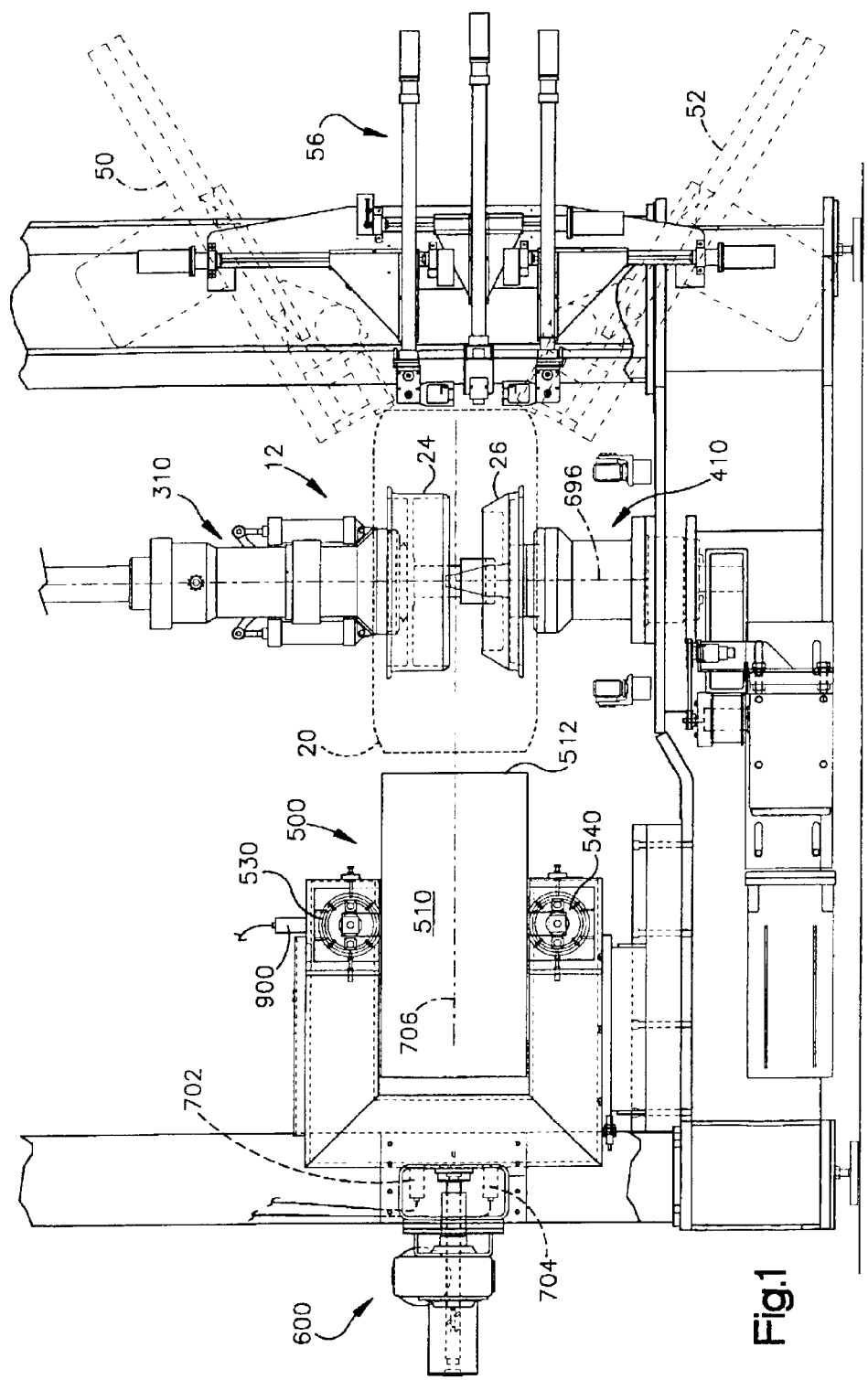
FIG. 1 is a fragmentary, side elevational view of a tire testing station and load wheel assembly constructed in accordance with a preferred embodiment of the invention.

FIG. 1 illustrates the overall arrangement of a tire uniformity machine that includes an apparatus for reducing the effects of erroneous vibrations on the measurement of force on a tire being tested. The overall tire uniformity machine is more fully described in co-pending application Ser. No. 08/988,480 filed on Dec. 10, 1997 and entitled "TIRE UNIFORMITY TESTING SYSTEM", the subject matter of which is incorporated by reference. A copy of the co-pending '480 application is attached as Appendix 1 to this application.

Referring to FIG. 1, the tire testing system includes a testing station 12 where a tire is tested and optionally ground to adjust the roundness, mechanically uniformity and/or other physical properties of the tire. In FIG. 1, a tire indicated by reference character 20 (shown in phantom) is delivered to the testing station 12 by a suitable conveyor such as the conveyor disclosed in the above-identified co-pending '480 application so that the tire is clamped between lower and upper rims 24, 26 of a chuck apparatus. The rims 24, 26 form, respectively, part of a spindle assembly 410 and a moveable chuck assembly 310. The chuck apparatus nay comprise an adjustable width chuck apparatus for a tire testing system that is disclosed in co-pending application Ser. No. 08/988,119, filed on Dec. 10, 1997 and entitled "AUTOMATIC ADJUSTABLE WIDTH CHUCK APPARATUS FOR TIRE TESTING SYSTEMS", the subject matter which is hereby incorporated by reference.

The tire is clamped between the rims 24, 26 and inflated via the chuck apparatus. After inflation, a load wheel 510 forming part of a loadwheel assembly 500 is moved into abutting relationship with the outer surface of the tire 20. As is conventional, the tire is rotated against the load wheel 510 which monitors the load exerted by the tire via load cells 530, 540. As is known in the art, the data taken from the load cells is used to determine the uniformity of the tire. If desired, adjustments to the uniformity of the tire are made by one or more grinders, indicated generally by the reference characters 50, 52 (shown in phantom).

The tire testing system includes a probe system indicated generally by the reference character 56. A probe system suitable for use with the illustrated tire testing system is fully disclosed in the above-identified '480 application entitle "TIRE UNIFORMITY TESTING SYSTEMS", the subject matter of which has been previously incorporated by reference and is contained in Appendix 1.

Figure 2:
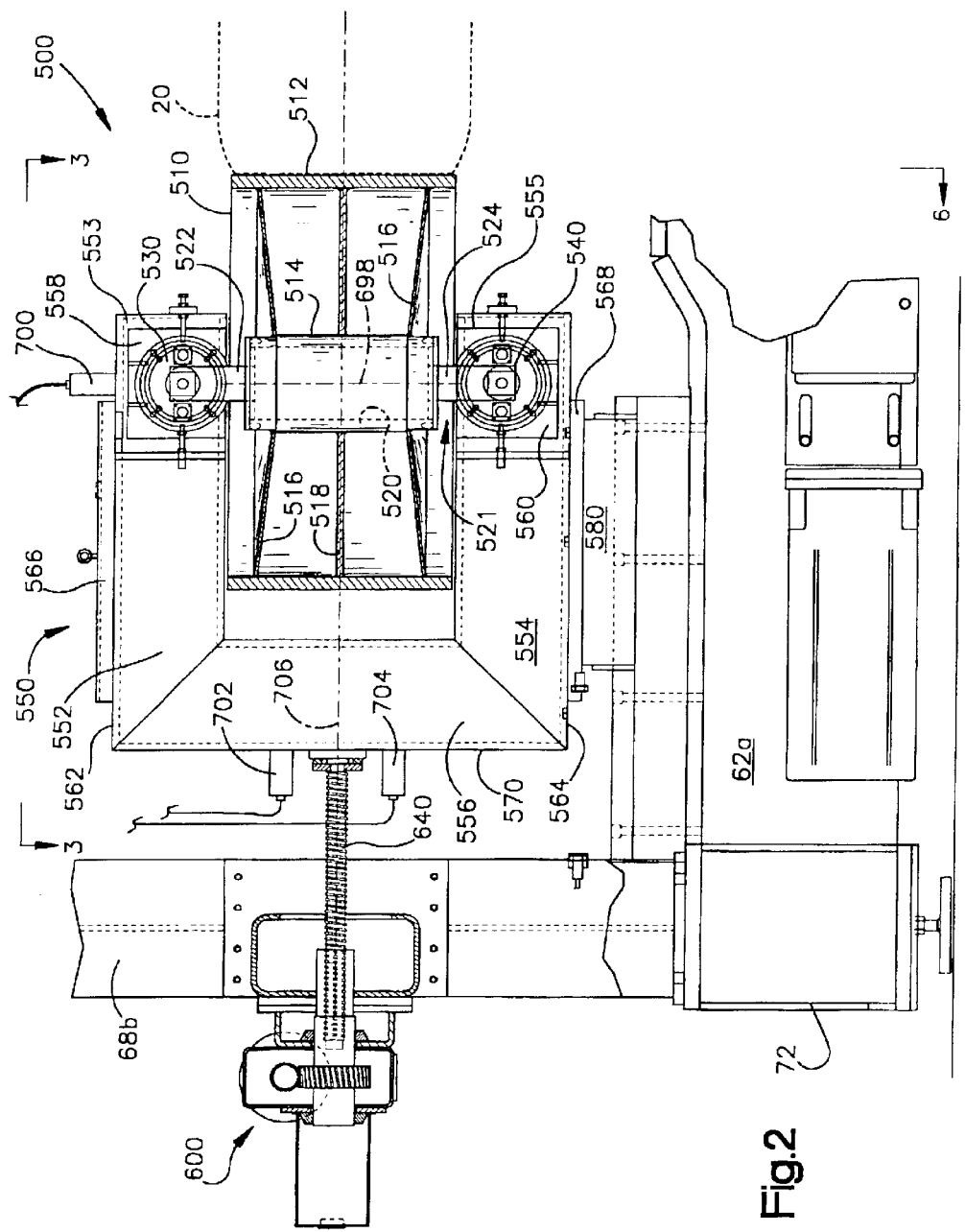
FIG. 2 is a fragmentary view of the load wheel assembly, portions of which are shown in section.

The load wheel assembly 500 may have various configurations. An example of a suitable load wheel assembly is disclosed in co-pending application Ser. No. 08/988,509, which is hereby incorporated by reference. A copy of the co-pending '509 application is attached as Appendix 2 to this application. Referring also to FIG. 2, the load wheel assembly 500 includes three main components, namely, a load wheel 510, C-shaped carriage 550 and a drive mechanism 600. The illustrated load wheel includes a cylindrical outer wall 512, the exterior of which contacts the rotating tire held by the chuck assembly, as is known in the art. The outer wall 512 of the load wheel 510 is connected to a hub 514 defining a hollow bore 520. Hub 514 is joined to the outer wall 512 by a plurality of solid annular disks 516, 518. In the illustrated embodiment of the load wheel, disk 516 are disposed between the hub 514 and outer wall 512 near the opposite ends thereof closing off the hollow interior of the load wheel while disk 518 is disposed between the central portions of hubs 514 and wall 512. Further details of the illustrative load wheel can be found in the above-identified '509 patent application.

Figure 3:
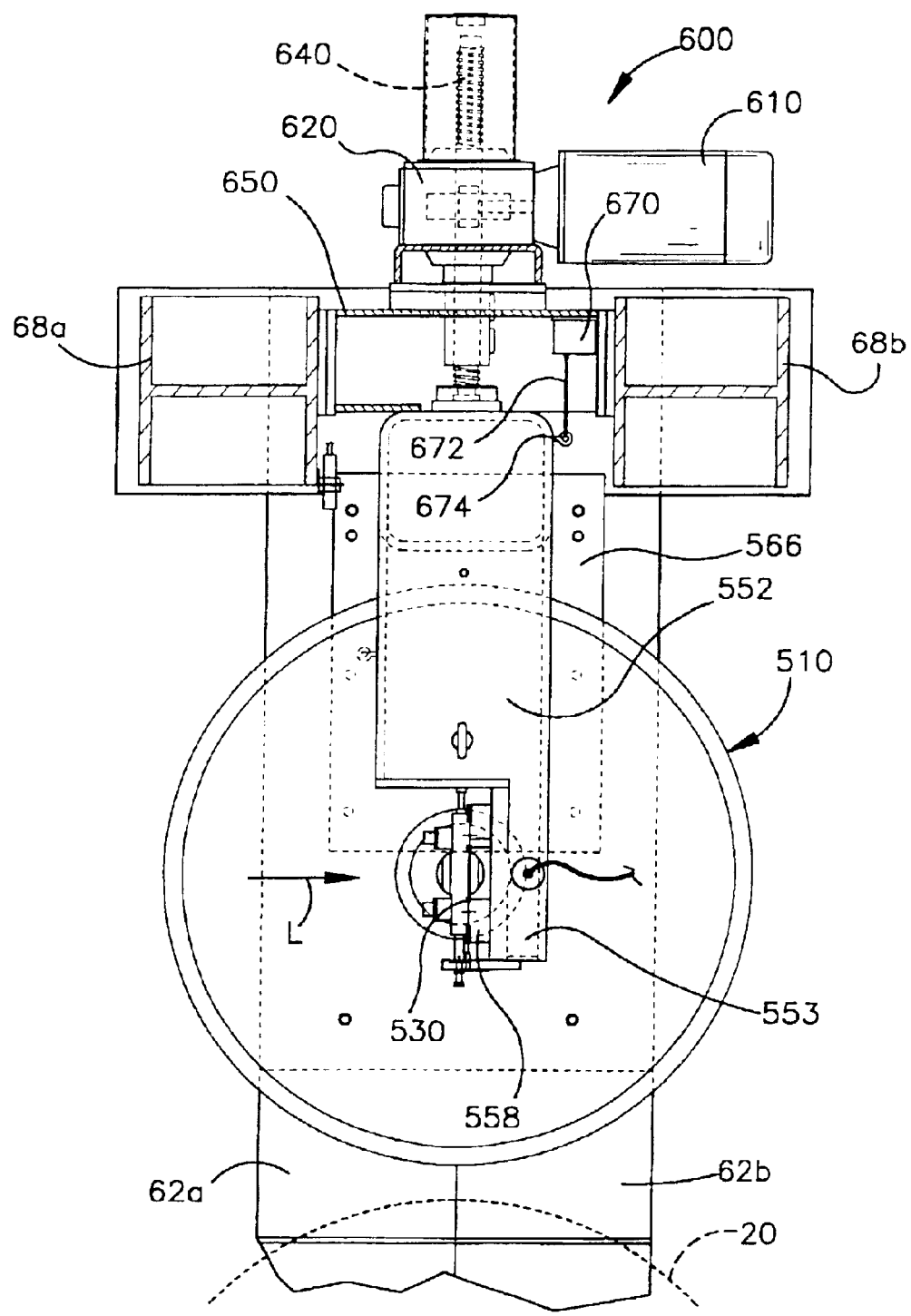
FIG. 3 is a top plan view of the load wheel assembly shown in FIG. 2.

Turning in particular to FIGS. 2 and 3, a C-shaped carriage 550 is shown to include an upper horizontal leg 552, a lower horizontal leg 554 and a vertical connecting leg 556 extending there between. The end portions 553, 555 of carriage legs 552, 554 are formed to include step or recessed areas attached to (or alternatively formed integrally width) mounting pads 558, 560. Pads 558, 560 mount the spindle ends 522, 524 of a load wheel spindle 521 and the load cells 530, 540.

As seen in FIG. 2, the C-shaped frame 552 is supported for sliding movement upon a base 62a. A drive mechanism 600 mounted to vertical frame pieces 68a, 68b (see FIG. 3) affects motion in the carriage 552 towards and away from a tire 20 located in the testing station. The drive includes a ball screw 640 operatively connected to the load wheel frame 552 at its radial center. Details of the drive mechanism 600 can be found in the above-identified '509 application. The disclosed tire uniformity machine includes data acquisition apparatus that compensates for extraneous vibrations and/or forces transmitted to the load cells 530, 540 which would ordinarily represent errors in the measurement system. These extraneous vibrations may be the result of equipment movement in the vicinity of the tire testing system and could also be the result of the movement of componentry forming part of the tire testing station itself such as movement and operation of the grinders 52, 54 or the operation of various conveyors (not shown).

The present invention substantially reduces the effect of these extraneous vibrations on the measurement of force variation of the tire in the testing station 12. In accordance with the preferred embodiment of the invention, the apparatus comprises one or more transducers or other sensors that measure or monitor the vibration of the tire testing machine in terms of its acceleration. The system may also include scaling mechanisms to adjust the output of the vibration measurement transducers/sensors in order to precisely represent the force generated by the acceleration according to Newton's law of motion (F=ma). These forces which are derived from the measured vibrations and which would normally produce errors or erroneous data, are subtracted from the combined vibration induced force and the tire uniformity force measured by the load cells 530, 540. This results in data that more accurately represents the actual force variation in the tire.

Referring to FIGS. 1 and 2, the vibration compensating apparatus includes acceleration transducers strategically mounted on the load wheel assembly 500. In the illustrated embodiment, two components of the vibration force are separately monitored. Typically, the tire uniformity machine measures forces in the "radial" and "lateral" directions. The term "lateral" in the tire testing art is defined to refer to forces along the axis of rotation of the tire, in the direction lateral to a tire as it would be oriented on a vehicle. In the tire testing machine shown in FIGS. 1 and 2, the tire is oriented horizontally during the test and thus the "lateral" force is actually directed vertically as viewed in FIGS. 1 and 2. In other words, the lateral force component acts along a vector that is parallel to the axis of rotation (indicated by the reference character 688 in FIG. 1) of the tire itself. The radial component is defined to be along the axis connecting the center of rotation of the tire and the load wheel, and is also directed horizontally, i.e., parallel to a plane of rotation of the tire.

The lateral component of the vibrations is monitored by an accelerometer 700 that is mounted at or near the axis of rotation 698 for the load wheel 510. As seen in FIG. 3, the actual mounting location for the lateral accelerometer 700 is offset to one side of the axis since in the illustrated construction, it is impossible to mount the accelerometer precisely on the rotational axis of the load wheel 510.

The radial component of the force is monitored by at least one accelerometer 702 mounted to the C-shaped carriage 552 of the load wheel assembly 500. In the illustrated embodiment, the carriage drive mechanism 600 is attached to the C-shaped carriage at its radial center. This makes it impossible for the accelerometer 702 to be located coincident with a center rotational plane indicated by the phantom line 706 for the load wheel 510. Accordingly, a pair of accelerometers 702, 704 are disposed on either side of the center plane and are symmetrically spaced about the axis to achieve the desired sensitivity to the force being monitored.

It should be noted that for accuracy, it is important that the acceleration measuring apparatus measure motion in the same direction that the motion of the mass causes the influence on the load cell measurement of force. In particular, uniformity machines are designed to be sensitive to the indicated forces, with very low sensitivity to the corresponding moment. If possible, the transducer for measuring acceleration should be mounted on a line which passes through the center of mass of the load wheel assembly in the desired measurement direction, i.e., lateral or radial. In some cases, this may not be possible, for lack of suitable mounting surfaces as is the case with the embodiment shown in FIG. 2. In these cases, two transducers may be used, symmetrically spaced about the axis to achieve the desired sensitivity to the force while reducing sensitivity to the moment.

It should also be noted that in some cases it is desirable to measure moments on uniformity machines. In these cases, symmetrically spaced acceleration transducers can also be used, connected to be sensitive to the difference in the moment around the axis.

In the preferred and illustrated embodiment, acceleration transducers 700, 702 and 704 form part of a uniformity testing machine such as that is disclosed in the above-identified co-pending '480 application. In the illustrated system, the load wheel has a mass of approximately 340 pounds. Two biaxial load cells 530, 540 are used to measure radial and lateral force. The load cells in the illustrated embodiment are Lebow Model 6443-105, with a range of 500 pounds in the lateral direction, and 2,000 pounds in the radial direction. These cells are summed to provide a total range of 1,000 pounds lateral and 4,000 pounds radial.

Figure 4:
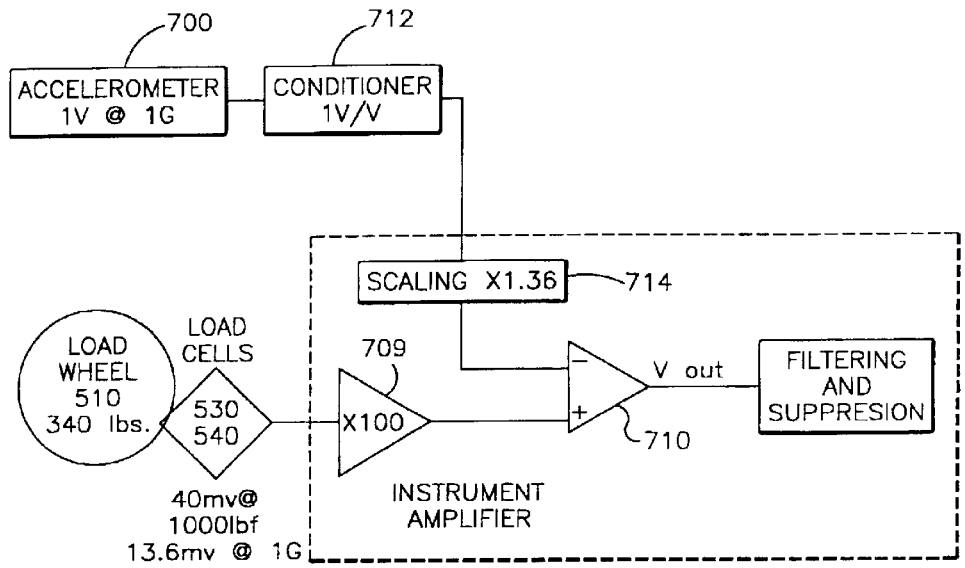
FIG. 4 is a block diagram illustrating a data acquisition method that compensates for erroneous lateral forces or lateral vibrations imparted to the test station and/or load wheel.
Figure 5:
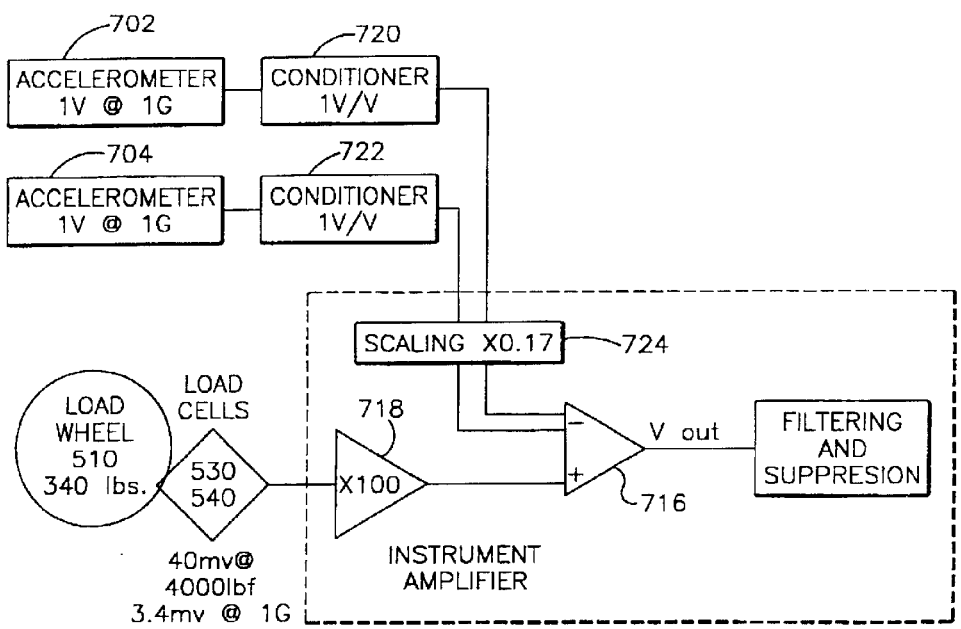
FIG. 5 is a block diagram illustrating a data acquisition method that compensates for erroneous radial forces or radial vibrations.

The load cell signals are processed by Akron Standard Instrument Amplifier Cards designated as model 440-0027-XX which are modified as shown in FIGS. 4 and 5. As seen in FIG. 4, the lateral channel includes a signal from the load cells 530, 540 which is amplified (by amplifier 709) and fed to a differential amplifier 710. A signal from the accelerometer 700 is conditioned (by conditioning circuitry 712) and scaled (by a factor of 1.36) by a scaler 714 and also fed to the differential amplifier 710 which outputs a net signal that is representative of the actual force variation being measured in the tire being tested.

Referring now to FIG. 5, the radial channel includes a signal received from the load cells 530, 540 communicated to another differential amplifier 716 via an amplifier 718. Acceleration related information is communicated by the accelerometers 702, 704 to the differential amplifier 716. The signals are conditioned and scaled (by signal conditioners 720, 722 and a scaler 724) and are summed with the load cell data resulting in data that does not include the radial force data generated by the erroneous vibrations.

It has been found that acceleration transducers denoted as PCB model 393A03 seismic accelerometers have produced satisfactory results. Signal conditioners known as PCB model 482A16 were used. The transducers 700, 702, 704 and the signal conditioners 720, 722 are available from PCB Piezotronics, Inc. of Depew N.Y. As indicated above, accelerometer 700 for measuring the extraneous forces in the lateral direction is mounted to the top of the load carriage 552 substantially vertically above the center of mass of the load wheel 510. The accelerometers 702, 704 for the radial direction are mounted to the load wheel assembly symmetrically above and below the center of mass of the load wheel since the ball screw 640 (see FIG. 2) which drives the load wheel carriage is located on the radial centerline.

As indicated above, the signals from the accelerometers 700, 702, 704 are scaled by scalers 714 and/or 724. The actual scaling factor for a given accelerometer, such as accelerometer 700, is determined by characteristics of the accelerometer itself. The methodology for arriving at an appropriate scaling factor is set out below. In particular, the scaling factor which is shown as 1.36 in FIG. 4 for the above-identified accelerometer 700 is derived as follows:

The scaling factor $K_4$ which is equal to 1.36 for the accelerometer 700 is thus used in the scaler 714.

Those skilled in the art will recognize that if alternate accelerometers are used, the above-identified methodology would be used to calculate the appropriate scaling factor. Those skilled in the art will also recognize how to apply this same methodology to arrive at the scaling factor for the radial accelerometers; namely accelerometers 702 and 704 which in the illustrated embodiment is 0.17.

Figure 6:
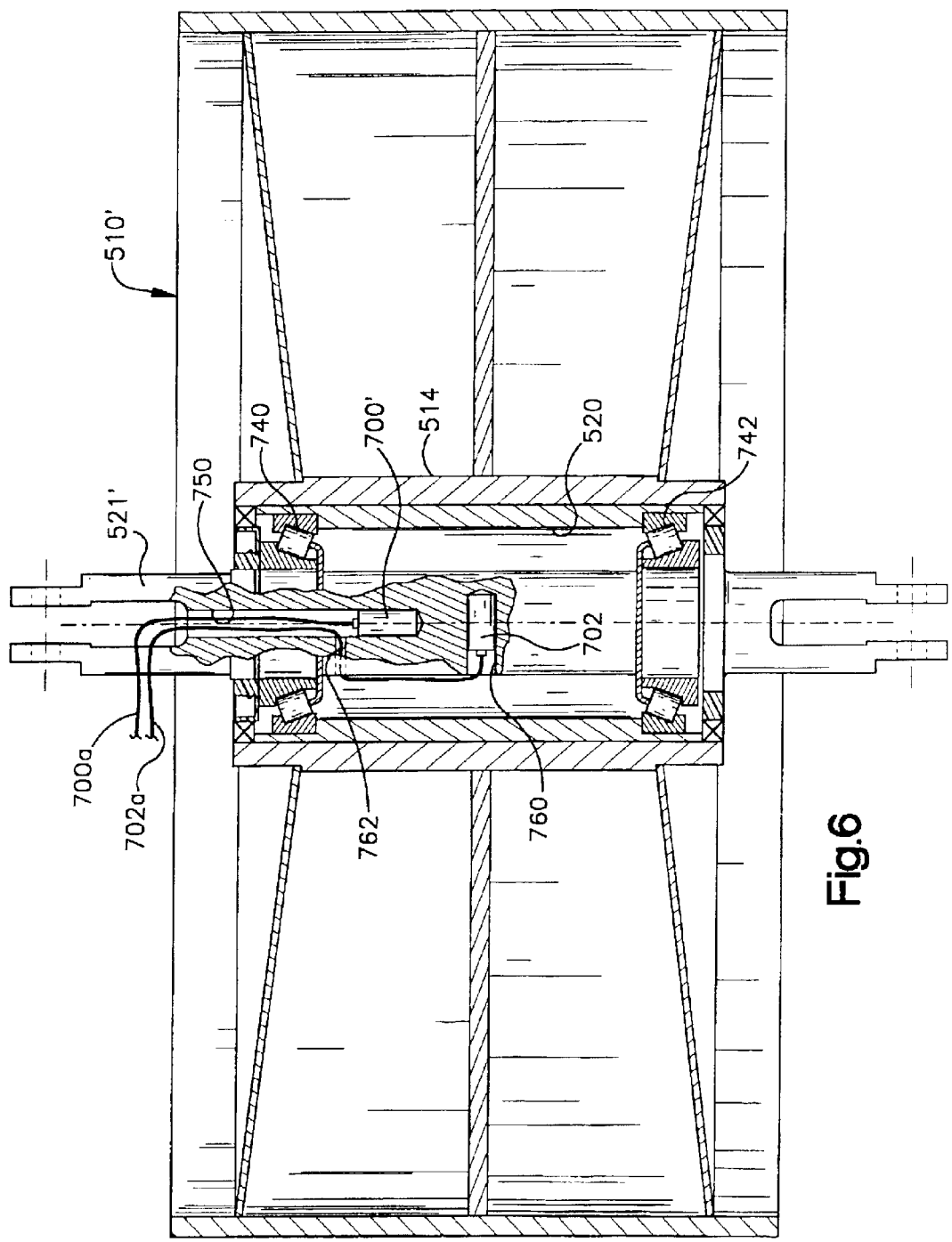
FIG. 6 is sectional view of a load wheel constructed in accordance with a preferred embodiment of the invention.

FIG. 6 illustrates an alternate embodiment in which accelerometers are mounted to the load wheel spindle itself.

In particular, the load wheel 510' is rotatably supported on a fixed axle or spindle 521' by a pair of roller bearings 740, 742. As seen in FIG. 6, an accelerometer 700' for measuring force in the lateral direction is mounted within a center bore 750 formed in the spindle 521'. Electrical signal conductors 700*a* for the accelerometer 700' are fed from the bore 750 to a suitable controller (not shown) that contains the channel circuitry depicted in FIG. 4.

A single accelerometer 702' for measuring forces in the radial direction is positioned in a diametrical bore 760 formed in the spindle 521'. Electrical signal carrying conductors 702*a* from the radial accelerometer 702' pass from the bore 760 along the outside of the axle 730 and enter the center bore 750 (in which the vertical accelerometer 700' is mounted) via a small cross bore 762. In the FIG. 6 embodiment, the accelerometers 700', 702' are located precisely along the respective lateral and radial axes of the load wheel assembly and should provide highly accurate data signals that accurately reflect the lateral and radial accelerations imparted to the load wheel assembly by external forces such as vehicular traffic in the plant or internal component movement such as movement in conveyors or grinders.

Although the invention has been described with a certain degree of particularity, it should be understood that those skilled in the art can make various changes to it without departing from the spirit or scope of the invention as hereinafter claimed.

I claim:

1. Apparatus for improving the measurement of force variation in a tire being tested on a tire uniformity machine, comprising:
    a) a loadwheel assembly including a rotatable loadwheel;
    b) load sensors for detecting forces imposed on said loadwheel by a tire being tested;
    c) one or more accelerometers for detecting vibrations in said loadwheel caused by forces other than the forces applied by said tire; and,
    d) means for subtracting said vibration induced forces from said tire imposed forces whereby more precise tire uniformity data is obtained.

2. The apparatus of claim 1 further comprising:
    i) a scaler for scaling a signal generated by said accelerometer; and,
    ii) means for subtracting said signal from a signal generated by said load cells.

3. The apparatus of claim 1 further including at least two accelerometers, one of said accelerometers for detecting vibrations that impose forces in a lateral direction defined as a direction that is parallel to an axis of rotation of said tire and a second accelerometer for detecting vibrations that produce forces in a radial direction.

4. A tire uniformity machine comprising:
    a) a loadwheel assembly;
    b) a tire testing station including a tire holding device for holding and rotating a tire in said tire testing station;
    c) means for rotating said tire in said tire testing station;
    d) means for contacting said tire with said loadwheel;
    e) means for measuring forces imposed by said rotating tire on said loadwheel;
    f) detecting means for detecting vibrations exerted on said loadwheel by forces generated by components within said tire uniformity machine other than said rotating tire;
    g) said detector means including an accelerometer and a scaler for scaling a signal generated by accelerometer in response to said vibrations;
    h) differential summing means for adjusting a signal generated by said load cells to remove any component caused by said vibration.

5. The apparatus of claim 4, wherein said detecting means includes lateral and radial accelerometers that are used to detect lateral and radial component forces generated by said extrinsic vibrations.

6. The apparatus of claim 5, wherein said accelerometers are mounted within a spindle about which said loadwheel rotates, said lateral accelerometer being located coincident with an axis of rotation defined by said spindle and said radial accelerometer located on a diametral line defined by said spindle.

7. A method for improving the measurement of forces variation on a tire uniformity machine comprising the steps of:
    a) providing a load wheel assembly including a loadwheel rotatively supported on a loadwheel frame;
    b) providing load cells operatively connected to said loadwheel to detect forces imposed on said loadwheel;
    c) monitoring acceleration forces applied to said loadwheel by acceleration transducers;
    d) subtracting data obtained from said accelerometer transducers from overall load cell data to arrive at more precise tire uniformity data.

8. The method of claim 7, further including the steps of scaling said signals generated by said accelerometers and summing said signal in a differential amplifier to arrive at a net signal that does not include data related to said acceleration forces.

9. A loadwheel for use in a tire testing machine, comprising:
    a) a loadwheel body defining a cylindrical outer surface at least a portion of which is contacted by a tire being tested in a testing station;
    b) a fixed spindle defining an axis of rotation for said loadwheel body;
    c) bearing means for rotatably supporting said loadwheel body on said spindle; and,
    d) at least one accelerometer mounted to said spindle for detecting acceleration induced by said loadwheel by forces other than forces generated by a tire being tested.

10. The loadwheel of claim 9, further comprising a second accelerometer mounted to said spindle, said first accelerometer located coincident with an axis of rotation defined by said spindle and said second accelerometer located on a diametral line defined by said spindle.

11. The loadwheel of claim 10, wherein said first accelerometer is located within an axial bore defined by said spindle.

12. The loadwheel of claim 11, wherein said second accelerometer is located in a bore aligned with said diametral line.

* * * * *